(12) United States Patent
Ferreira et al.

(10) Patent No.: US 7,761,527 B2
(45) Date of Patent: Jul. 20, 2010

(54) METHOD AND APPARATUS FOR DISCOVERING NETWORK BASED DISTRIBUTED APPLICATIONS

(75) Inventors: Nelson S. Ferreira, New Rochelle, NY (US); Eyal Yardeni, Ardsley, NY (US); Salvatore De Simone, Woodbury, CT (US); Renin Jegadeesan, Stamford, CT (US)

(73) Assignee: EMC Corporation, Hopkinton, MA (US)

( * ) Notice: Subject to any disclaimer, the term of this patent is extended or adjusted under 35 U.S.C. 154(b) by 1501 days.

(21) Appl. No.: 11/054,578

(22) Filed: Feb. 9, 2005

(65) Prior Publication Data

US 2005/0192965 A1    Sep. 1, 2005

Related U.S. Application Data

(60) Provisional application No. 60/543,196, filed on Feb. 10, 2004, provisional application No. 60/604,330, filed on Aug. 25, 2004.

(51) Int. Cl.
*G06F 15/16* (2006.01)
*G06F 15/173* (2006.01)
*H04L 12/16* (2006.01)
*H04Q 11/00* (2006.01)

(52) U.S. Cl. .................. 709/207; 709/204; 709/224; 370/260; 370/395

(58) Field of Classification Search .................. None
See application file for complete search history.

(56) References Cited

U.S. PATENT DOCUMENTS

| 5,655,081 A | 8/1997 | Bonnell |
| 5,978,594 A | 11/1999 | Bonnell |
| 6,002,869 A * | 12/1999 | Hinckley .................. 717/124 |
| 6,075,943 A * | 6/2000 | Feinman .................. 717/175 |
| 6,182,136 B1 | 1/2001 | Ramanathan |
| 6,182,146 B1 * | 1/2001 | Graham-Cumming, Jr. . 709/238 |
| 6,286,047 B1 | 9/2001 | Ramanathan |
| 6,336,138 B1 | 1/2002 | Caswll |
| 6,775,655 B1 * | 8/2004 | Peinado et al. .............. 705/59 |
| 7,200,862 B2 * | 4/2007 | Murching et al. ............. 726/3 |
| 7,340,776 B2 * | 3/2008 | Zobel et al. .................. 726/24 |
| 7,418,478 B1 * | 8/2008 | Orling et al. .............. 709/207 |
| 2002/0178436 A1 * | 11/2002 | Mastrianni et al. ......... 717/110 |
| 2004/0046785 A1 * | 3/2004 | Keller ...................... 345/734 |
| 2004/0054690 A1 * | 3/2004 | Hillerbrand et al. ...... 707/104.1 |
| 2004/0078568 A1 * | 4/2004 | Pham et al. ................ 713/165 |
| 2004/0111273 A1 * | 6/2004 | Sakagami et al. .......... 704/277 |
| 2004/0139097 A1 * | 7/2004 | Farber et al. .............. 707/100 |
| 2004/0193906 A1 * | 9/2004 | Dar et al. .................. 713/200 |

* cited by examiner

*Primary Examiner*—Ario Etienne
*Assistant Examiner*—Ho Shiu
(74) *Attorney, Agent, or Firm*—Krishnendu Gupta; Joseph D'Angelo

(57) ABSTRACT

A method and apparatus for discovering applications having components distributed over a plurality of nodes in a network is disclosed. The method comprises the steps of obtaining information associated with at least one application, said information providing first and second instructions, executing processing associated with the first instructions, determining a tentative identification of at least one application based on responses associated with the processing of the first instructions, executing processing associated with the second instructions based on each of the tentatively identified applications, and confirming an identification of at least one application based on responses associated with the processing of the second instructions. In one aspect of the invention, the method further comprises the step of storing the application identification and characteristics in a representation of the application.

40 Claims, 15 Drawing Sheets

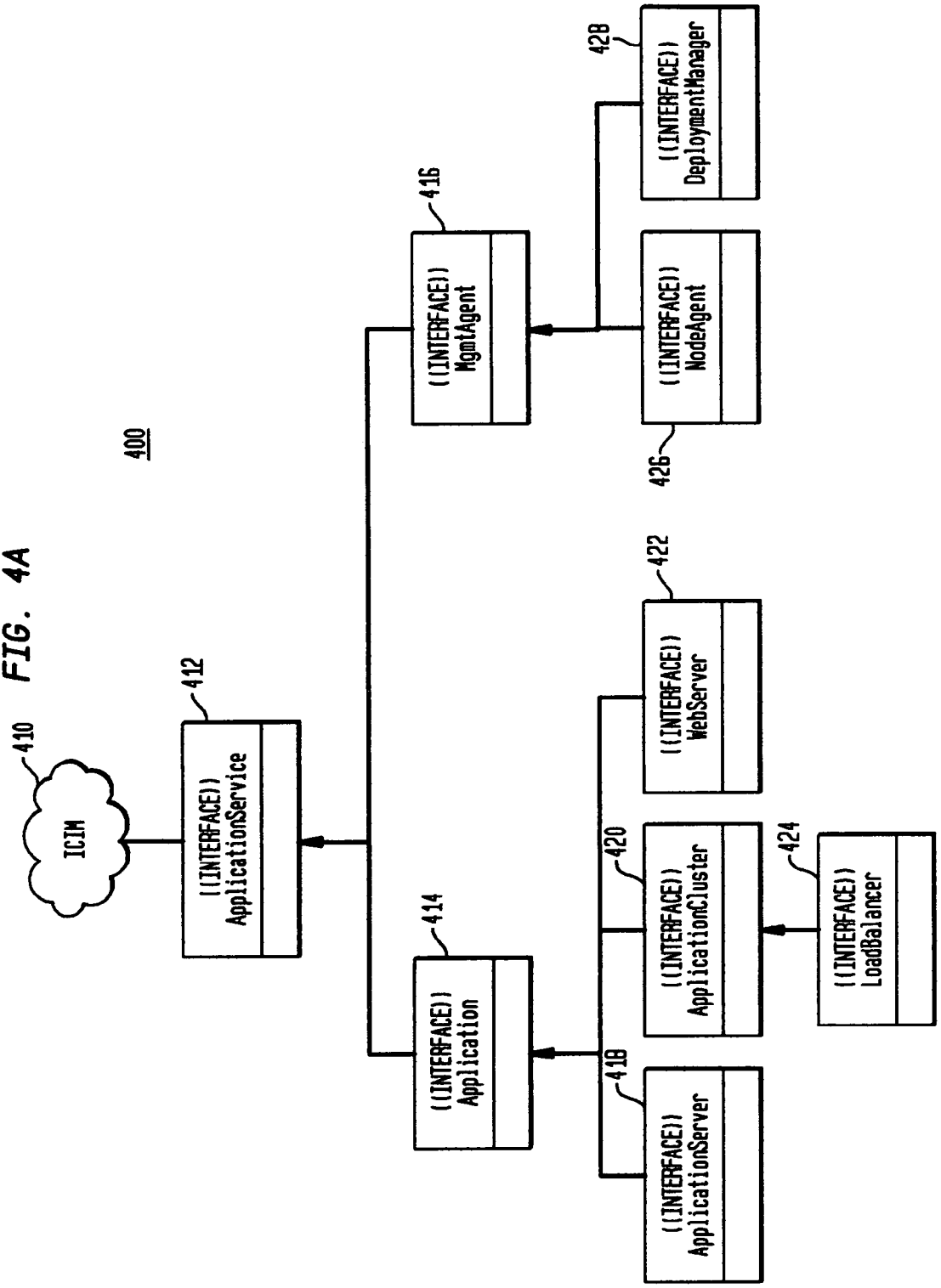

FIG. 6A

| APPL. \ DET. | $APP_1$ | $APP_2$ | ... | $APP_m$ |
|---|---|---|---|---|
| $DET_1$ | 1.0 | .5 | | .3 |
| $DET_2$ | 1.0 | 1.0 | | .4 |
| $DET_3$ | .5 | .7 | | 1.0 |
| $DET_4$ | .75 | 0 | | 0. |
| ⋮ | | | | |
| $DET_m$ | 0 | .2 | | .5 |

FIG. 6B

| | $APP_1$ | $APP_2$ | ... | $APP_m$ |
|---|---|---|---|---|
| $DET_1$ | 1.0 | .5 | | .3 |
| $DET_2$ | 1.0 | 1.0 | | .4 |
| $DET_3$ | .5 | .7 | | 1.0 |
| $DET_4$ | .75 | 0 | | 0. |
| ⋮ | | | | |
| | | | | |
| $DET_i$ | 0 | 0 | | 1.0 |
| $DET_j$ | 0 | 0 | | 1.0 |
| ⋮ | | | | |
| $DET_m$ | 0 | .2 | | .5 |

FIG. 7A
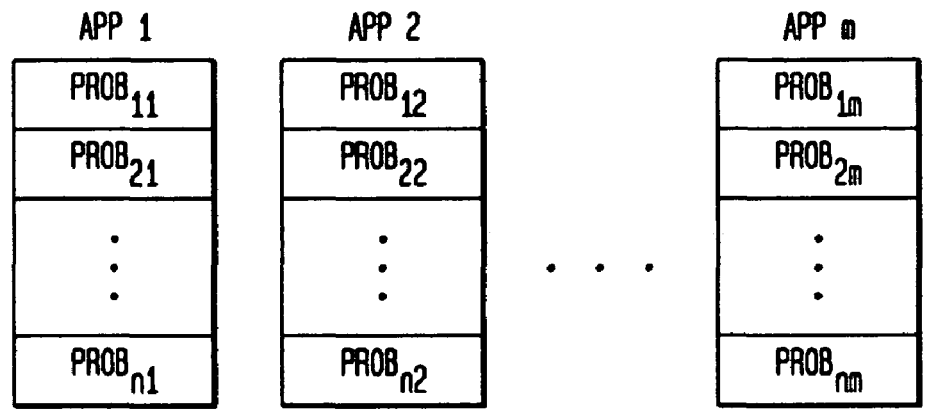
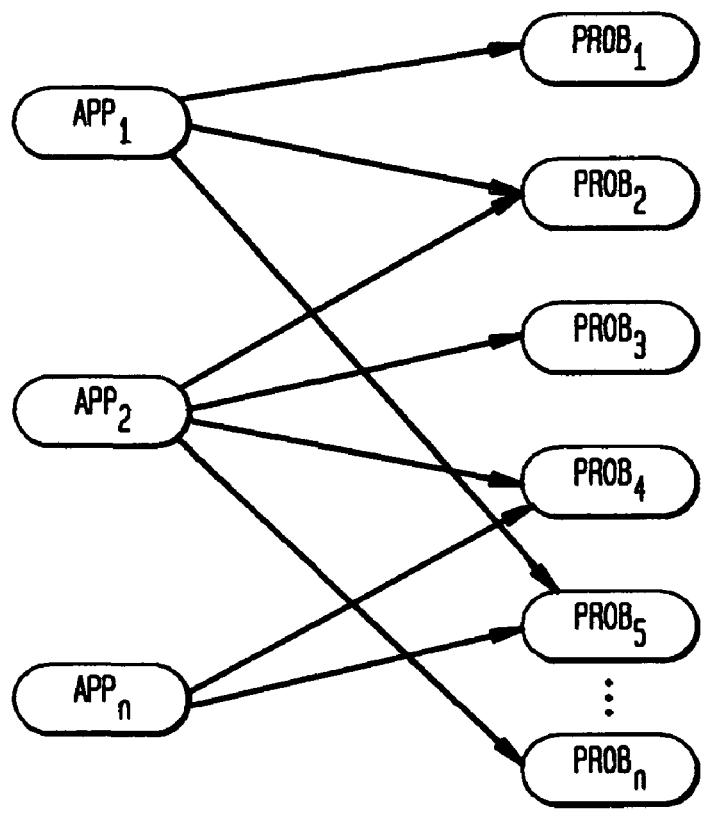
FIG. 7B

FIG. 8A

| | |
|---|---|
| PORT: 9091 | 810 |
| REQUEST: GET/HTTP/1.0 | 812 |
| RESPONSE: "SERVER: WEBSPHERE" | 814 |
| PROCESS NAME: /WEBSPHERE/APP SERVER/JAVA | 816 |
| ⋮ | |
| PROBE: WAS PROBE | 818 |
| TEST: | |

FIG. 8B

| | |
|---|---|
| PORT: 9091 | 820 |
| REQUEST: GET/HTTP/1.0 | 822 |
| RESPONSE: "SERVER: WEBSPHERE" | 824 |
| PROCESS NAME: /WEBSPHERE/DEPLOYMENT/JAVA | 826 |
| ⋮ | |
| PROBE: WAS DOMAIN | 828 |
| TEST: | |

FIG. 9

| | APPSERVER | DEPLOYMENT |
|---|---|---|
| PORT | 1 | 1 |
| PROC 1 | 1 | 0 |
| PROC 2 | 0 | 1 |
| | | |

# METHOD AND APPARATUS FOR DISCOVERING NETWORK BASED DISTRIBUTED APPLICATIONS

CLAIM OF PRIORITY

This application claims the benefit, pursuant to 35 USC §119(e) to:

U.S. Provisional Patent Application Ser. No. 60/543,196, entitled "Model-Based Application Discovery," filed on Feb. 10, 2004, and U.S. Provisional Patent Application Ser. No. 60/604,330, entitled "Method and Apparatus for Identifying and Classifying Network-Based Applications," filed on Aug. 25, 2004, the contents of both of which are incorporated by reference herein

RELATED APPLICATION

This application is related to commonly-owned, concurrently filed, U.S. patent application Ser. No. 11/054,577, entitled "Method and Apparatus for Identifying and Classifying Network-Based Applications."

RELATED FIELD

This application is related to the field of distributed systems, and more specifically, discovery of distributed application components and identification of the related application topology.

BACKGROUND OF THE INVENTION

The use of computer networks has become an integral part of the way businesses provide goods and services to their customers. One advantage the use of networks provides is to enable the distribution of applications and the underlying business logic closer to the actual user or customer. This enables these businesses to offer higher levels of service to disparate groups of customers in a wider geographic area than ever before. This has also enabled businesses to allow customers access to the business network, albeit limited, for example, to directly track their purchases. In this case, each customer may have access to standardized or "tailored" application software packages or to custom developed software packages to perform desired operations.

Initially, networks were of a client/server type where the client represented a requestor of services and a server was the provider of the requested servers. However, this network configuration proved to be limiting and multi-tier networks were next developed. The multi-tier network configuration provides improved flexibility and scalability over the client/server network In the multi-tier network, a middle tier, between a client requesting information and server including a data base, developed that provided services such as transaction monitoring, message servicing and applications services. The middle tier layer thus provided queuing of client requests, application execution and data base staging. The middle tier layer may be further divided into units of different functions to further improve flexibility and scalability. In this case, the middle tier may include applications written in HTML (Hyper-Link Textual Markup Language), which is well-known in the art, for communication with the client and application servers written in C++ or Java programming languages, which are also well-known in the art. To fill the gap between the HTML and C++ applications, an intermediate web server layer may be incorporated to translate messages between the two application layers.

In a further network expansion, a distributed/collaborative enterprise architecture based on an Object Request Broker and/or a Common Object Request Broker Architecture was developed. This enterprise architecture allows for the use, and reuse, of business models on an enterprise-wide scale; an enterprise, in this case, represents a system comprised on multiple business systems or multiple subsystems.

However, as businesses take advantage of their networks and their networks expand, either in a planned manner or by the acquisition of other networks, the number of application packages may increase significantly. In some cases, the state of all the application packages, e.g., "running," "installed but non-running," and their locations may not be known or appreciated, particularly for those application packages that may be tailored or those that have narrow usage. In addition, enterprise applications, telecom services and other such services, need not be isolated entities existing on a single host, but rather may be distributed with dependent components present on multiple hosts within their enterprise and sometimes even spanning enterprises. In addition, application components may be updated on some servers and not in others. Hence, while application are composed of software-compatible components, a single definition of the application is not necessarily determinable.

In order to determine the existence of the application and their operating state, it is often required to discover many of the distributed pieces or components and the relationships between them, i.e., the application's "topology," and further to make a determination that the application has indeed been found. This is not a straightforward task as the variability in configuration and deployment options for these applications is high. For example, to discover simple processes that are running in a UNIX-based system, a user may use a command line tool, e.g., an instruction, such as UNIX command "ps" to "dump the process table," for example. This command line tool creates a list of processes executing on a specific host on the network. The list may then be filtered using the UNIX "grep" command line with known search criteria. This specific methodology is, of course, of limited value as it is unable to discover non-running applications and does not discover the applications topology (i.e., the relationships among distributed components). More sophisticated tools, referred to as agents, may be built or created to probe still deeper into the components and their relationships. However, as in the prior example, there is no knowledge of what the relationships among multiple processes are, and only currently running processes may be discovered.

Thus, as the network expands it can become bloated with forgotten application packages that may have little or no usage, but are left in place as the consequence of their removal is unknown. On the other hand, leaving unused applications where they are installed may cause harm by consuming valuable disk space and/or if running, also consuming valuable CPU cycles. Most importantly, there are critical applications that must be running with optimal performance for a business to service their customers and effectively run their operation.

To manage the applications, whether active, active and forgotten, or not running, it is important to understand or have knowledge of the configuration of the application components. Application configuration information includes the description of the application, its components, the relationship between applications, the relationship between the components, and how the components are related with the underlying system and environment on which they are running.

Examples of aspects of an application component include its structure at a device, its structure across devices, its performance characteristics, its dependencies with other applications in the device, and its dependencies with other applications in other devices. However, no systematic method exists to interrogate the network and determine applications residing on the network, and their status based on the discovered components.

Hence, there is a need in the industry for a systematic method and apparatus for discovering distributed application components and identifying the associated application topology.

SUMMARY OF THE INVENTION

A method and apparatus for discovering applications having components distributed over a plurality of nodes in a network is disclosed. The method comprises the steps of obtaining information associated with at least one application, said information providing first and second instructions, executing processing associated with the first instructions, determining a tentative identification of at least one application based on responses associated with the processing of the first instructions, executing processing associated with the second instructions based on each of the tentatively identified applications, and confirming an identification of at least one application based on responses associated with the processing of the second instructions. In one aspect of the invention, the method further comprises the step of storing the application identification and characteristics in a representation of the application.

BRIEF DESCRIPTION OF THE FIGURES

FIG. 4A illustrates an exemplary model in accordance with the principles of the invention;

FIGS. 6A and 6B illustrate exemplary correlation operations for identifying applications in accordance with the principles of the invention;

FIGS. 7A-7C illustrate exemplary methods for determining selected executable processes in accordance with the principles of the invention;

FIGS. 8A and 8B illustrate exemplary application information in accordance with the principles of the invention;

FIG. 9 illustrates an exemplary application discovery correlation matrix based on the application information shown in FIGS. 8A and 8B;

Figure 1A:
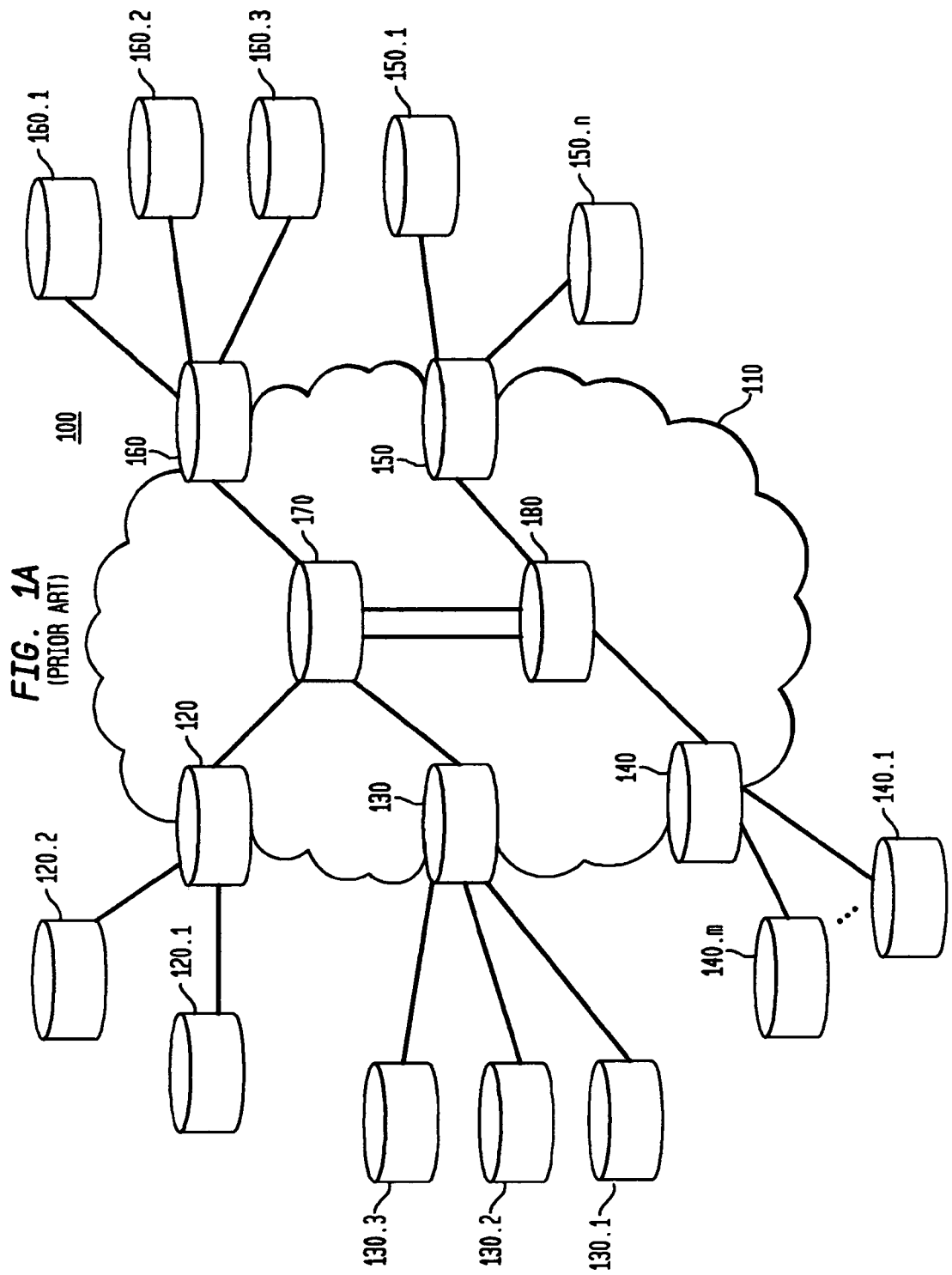
FIG. 1A illustrates a conventional multi-tiered network configuration.

It is to be understood that these drawings are solely for purposes of illustrating the concepts of the invention and are not intended as a definition of the limits of the invention. The embodiments shown in the figures herein and described in the accompanying detailed description are to be used as illustrative embodiments and should not be construed as the only manner of practicing the invention. Also, the same reference numerals, possibly supplemented with reference characters where appropriate, have been used to identify similar elements

DETAILED DESCRIPTION

FIG. 1A illustrates a conventional multi-tiered network configuration 100 containing middle tier servers 120-160, which are selectively in communication with data base servers 170 and 180. Further illustrated are client servers in communication with associated middle tier servers, e.g., client servers 120.1, 120.2 in communication with middle tier server 120, and client servers 150.1-150.n in communication with middle tier server 150. Network 100 may represent a conventional distributed system suitable for e-business transactions such purchasing over public or private networks, e.g., Internet. In the illustrated case, users (not shown) in communication with client servers 120.2, for example, may request information stored on data bases 170 and/or 180 through corresponding middle layer server 120.

Figure 1B:
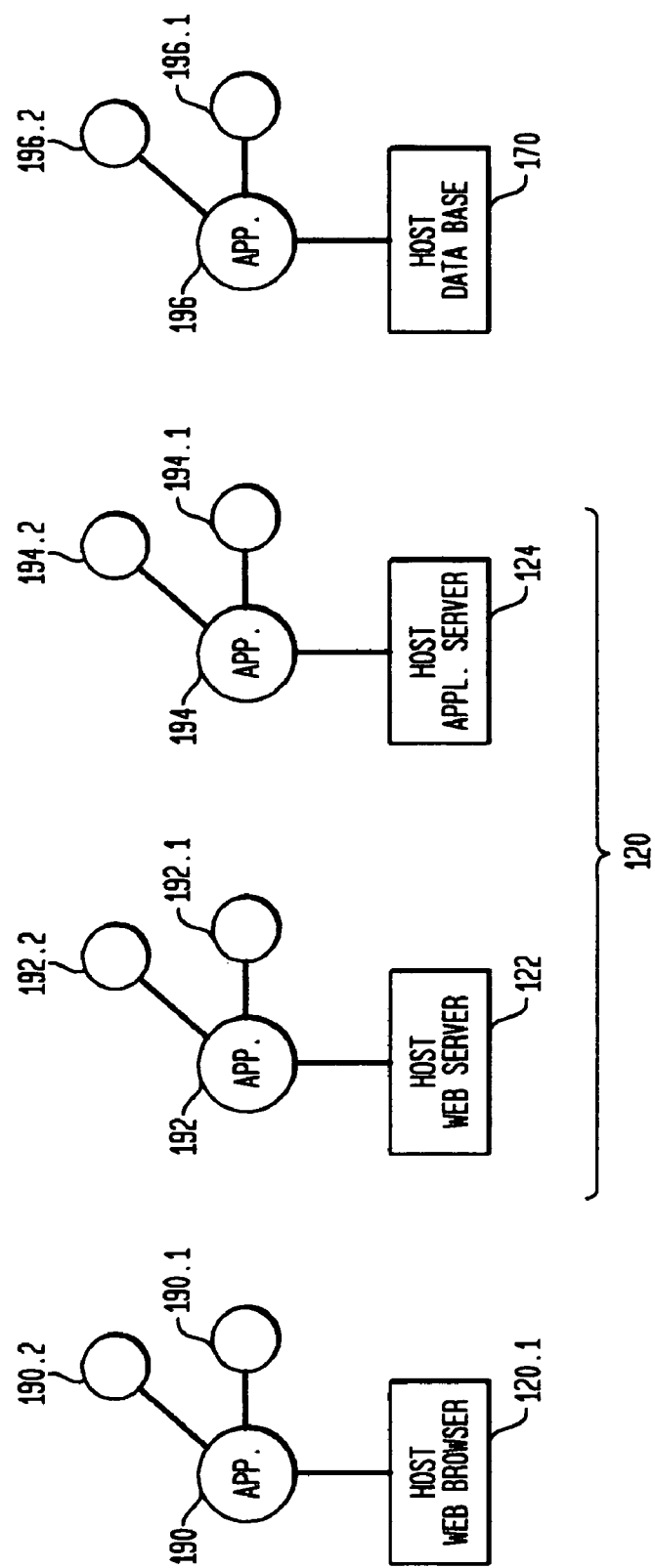
FIG. 1B illustrates abstract relationship among components in a multi-tier network configuration.

FIG. 1B illustrates an exemplary abstract relationship among components in the multi-tier network configuration shown in FIG. 1A. In this abstract representation an application 190 associate with a web browser is hosted on client server 120.1. Application 190 contains at least the two illustrated components 190.1 and 190.2. Also illustrated is middle tier server 120, which may be shared, as shown, between or among servers. For example, web server 122 may be hosted on the same server 120.1 as the web browser or may be hosted on the same server that hosts the application server 124. In either case, application 192, containing components 192.1, 192.2, is hosted on web server 122 and application 194 is hosted on application server 124. Further illustrated is data base 170 hosting application 196 having components 196.1, 196.2. As one skilled in the art would recognize, the applications 190, 192, 194 and 196, together, represent an application that enables the completion of a desired function or task. For example, the components of each application 190-196, may be written specifically for the application or may be a commercially-available software package that performs desired operations or functions. For example, application 190 may be a commercially-available data base management software, such as ORACLE, and component 190.2 may represent a "glue-ware" that enables operations from custom applications to access available data using an ORACLE-type commands. ORACLE is a registered trademark of the Oracle Corporation.

Figure 2:
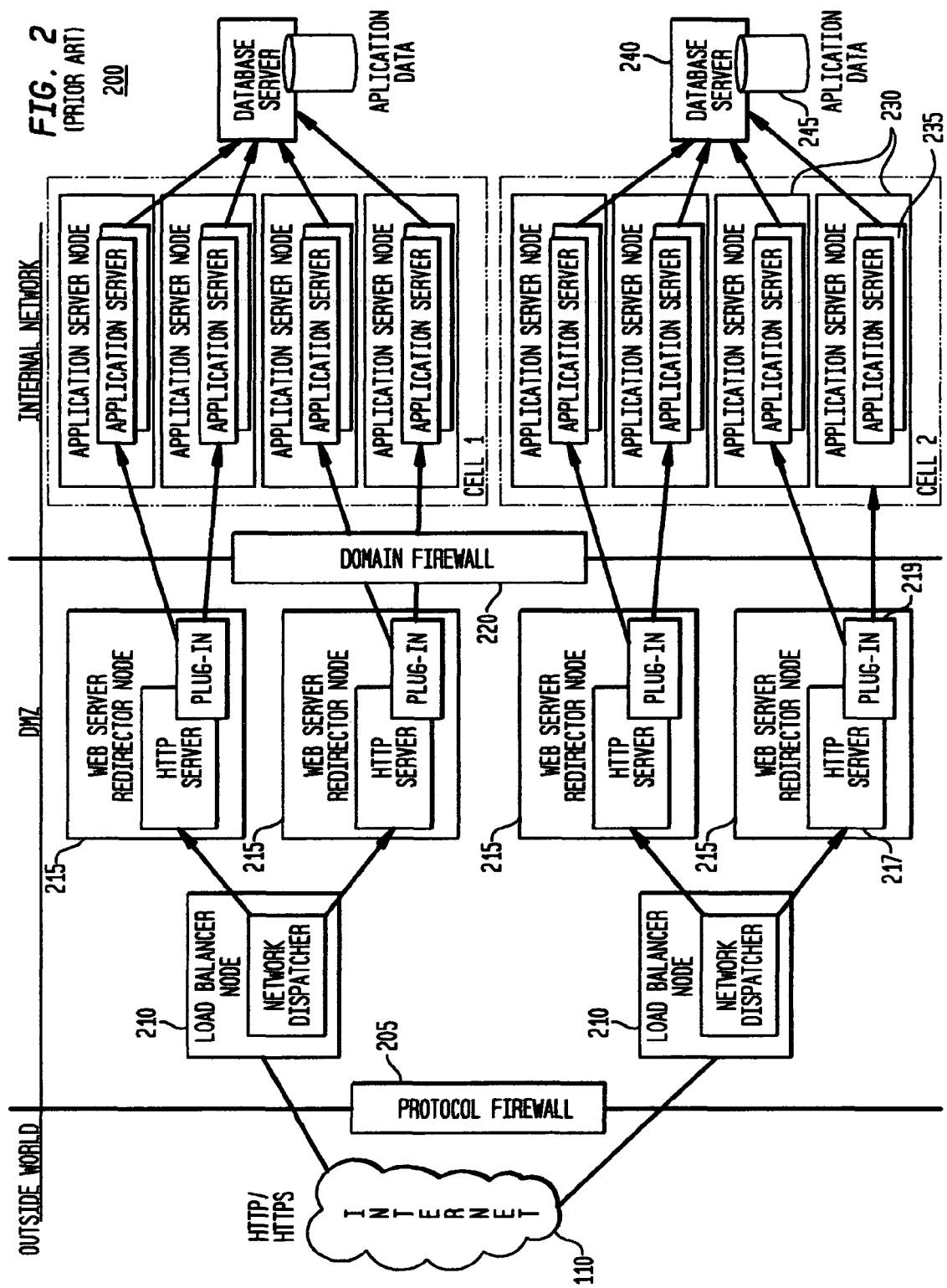
FIG. 2 illustrates a conventional J2EE distributed system.

FIG. 2 illustrates the distribution of a conventional J2EE software application using the multi-tier method described in FIGS. 1A and 1B. In this illustrated application, information is received over the Internet 110 and, when acceptable, passes through firewall 205. The information is provided to load balancer nodes 210, which are used to distribute, substantially evenly, information among connected or associated meddle tier webservers 215. The webservers 215, receiving the data via an HTTP server 217, directs the information, using an appropriate plugin 219, to the desired application server node 230 and associated application server 235. The information may request additional information be retrieved from database server 240. In this aspect, database server 240 hosting application software 245, executes appropriate operations, e.g., read/write, in response to the requests provided.

Figure 3A:
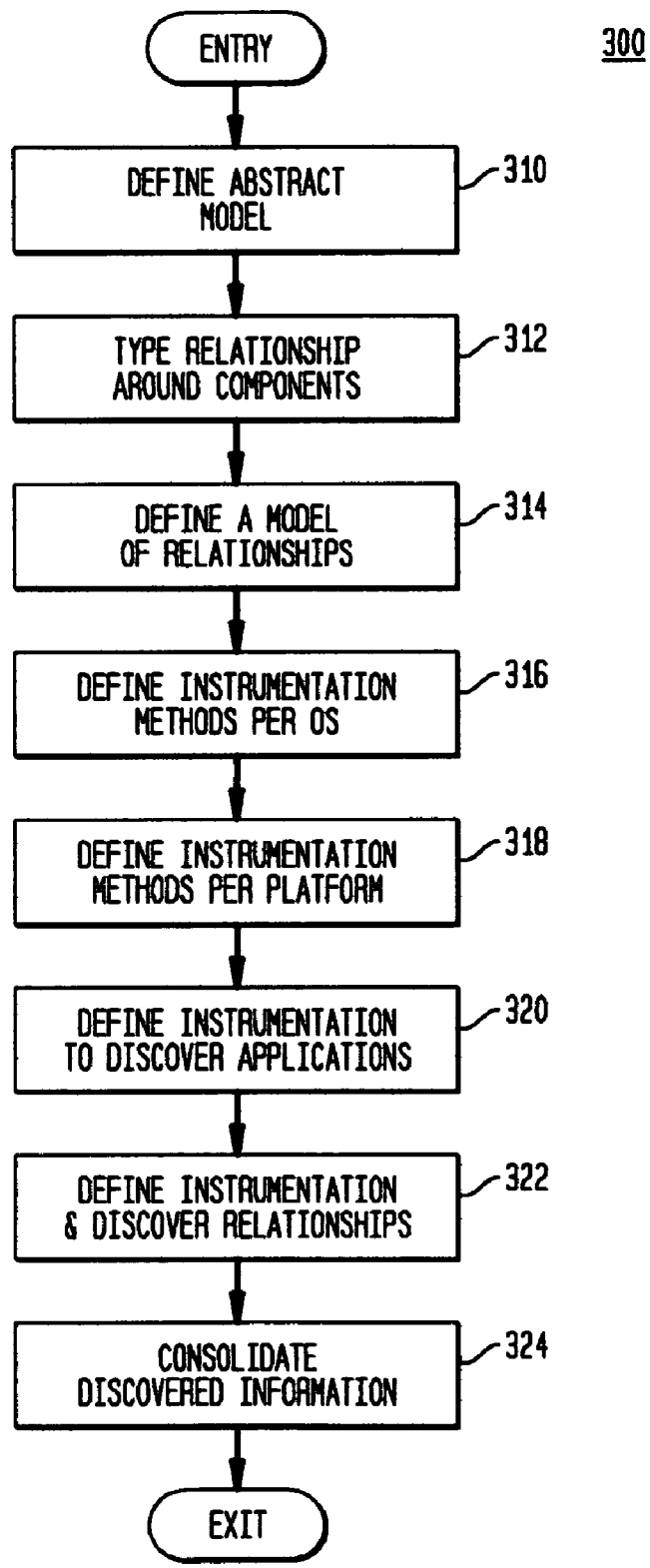
FIGS. 3A-3C illustrate flow charts of an exemplary process for discovering application processes in accordance with the principles of the invention.

FIG. 3A illustrates a flow chart of an exemplary process 300 for discovering, or identifying and classifying, applications in accordance with the principles of the invention. In this exemplary process, an abstract model of the application is developed at block 310. At block 312, types of relationships among the components of the abstract model are determined and stored within the model. At block 314, a model of the relationships among the components is defined. At block 316, instrumentation methods associated with the type of application are defined. The instrumentation methods, referred to a detectors and/or probes, as will be more fully discussed, are developed for each different computer operating system for which the application is running on. Well-known operating systems are Windows, Unix, Linux, MacOS. Further, the same detectors and probes may be suitable for each operating system or may be tailored dependent upon the specific characteristics of each operating system. At block 318, the probes or detectors are further defined for each type of computing system, i.e., platform, for which the application is running on. Well-known types of platforms are Wintel (i.e., Windows/INTEL) Personal Computers (PC), Sun Microsystems Corporation Solaris-based servers, etc.

At block 320, probes and/or detectors to discover specific applications are further defined and at block 322 probes and/or detectors to discover the relationships of the specific applications are defined. At block 324, the information from the detectors and probes are consolidated and stored into the abstract model.

Figure 3B:
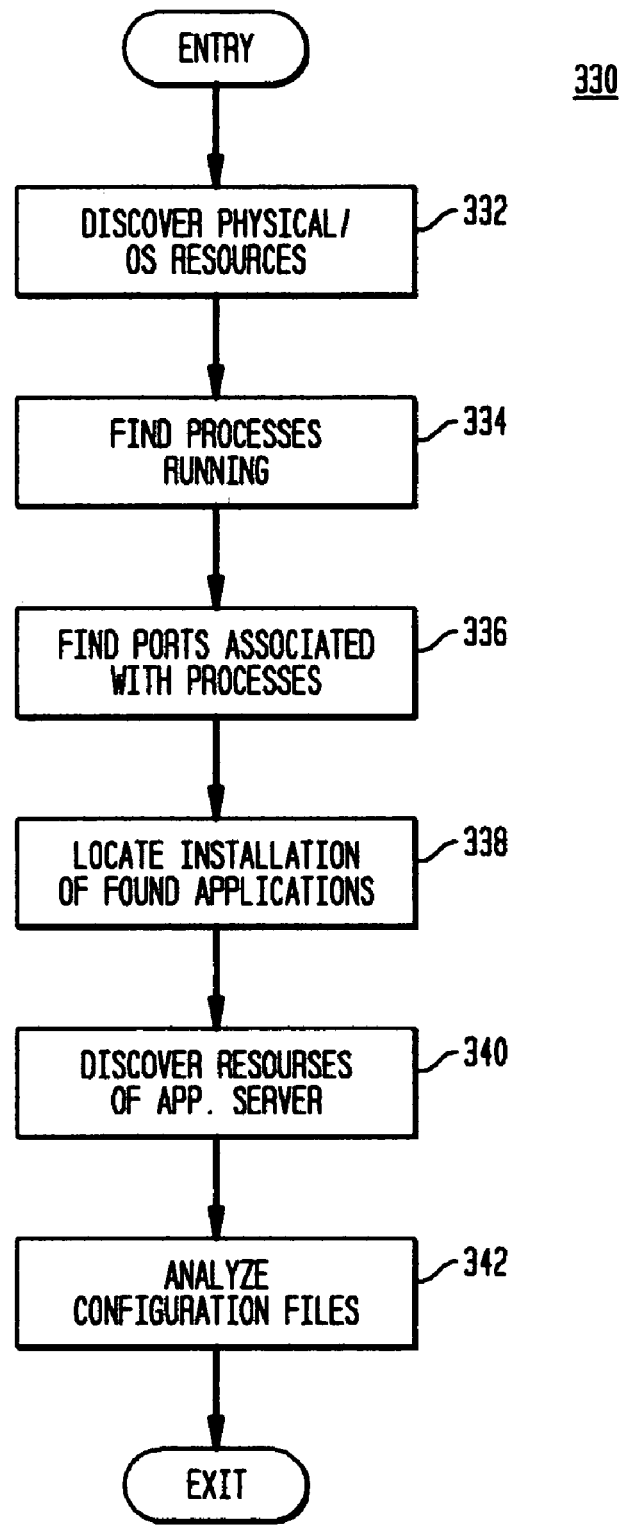

FIG. 3B illustrates a flow chart of an exemplary process 330 for discovering applications and processes on a local application server (i.e., platform or host). In this illustrative process, discovery of physical and operating system resources are discovered at block 332 using defined detectors and probes. At block 334, running processes are discovered. At block 336, ports associated with the running processes are discovered. At block 338, the installations of the discovered applications are discovered and, at block 340, the resources of the application server are discovered. At block 342, the configuration files are then reviewed and stored.

Figure 3C:
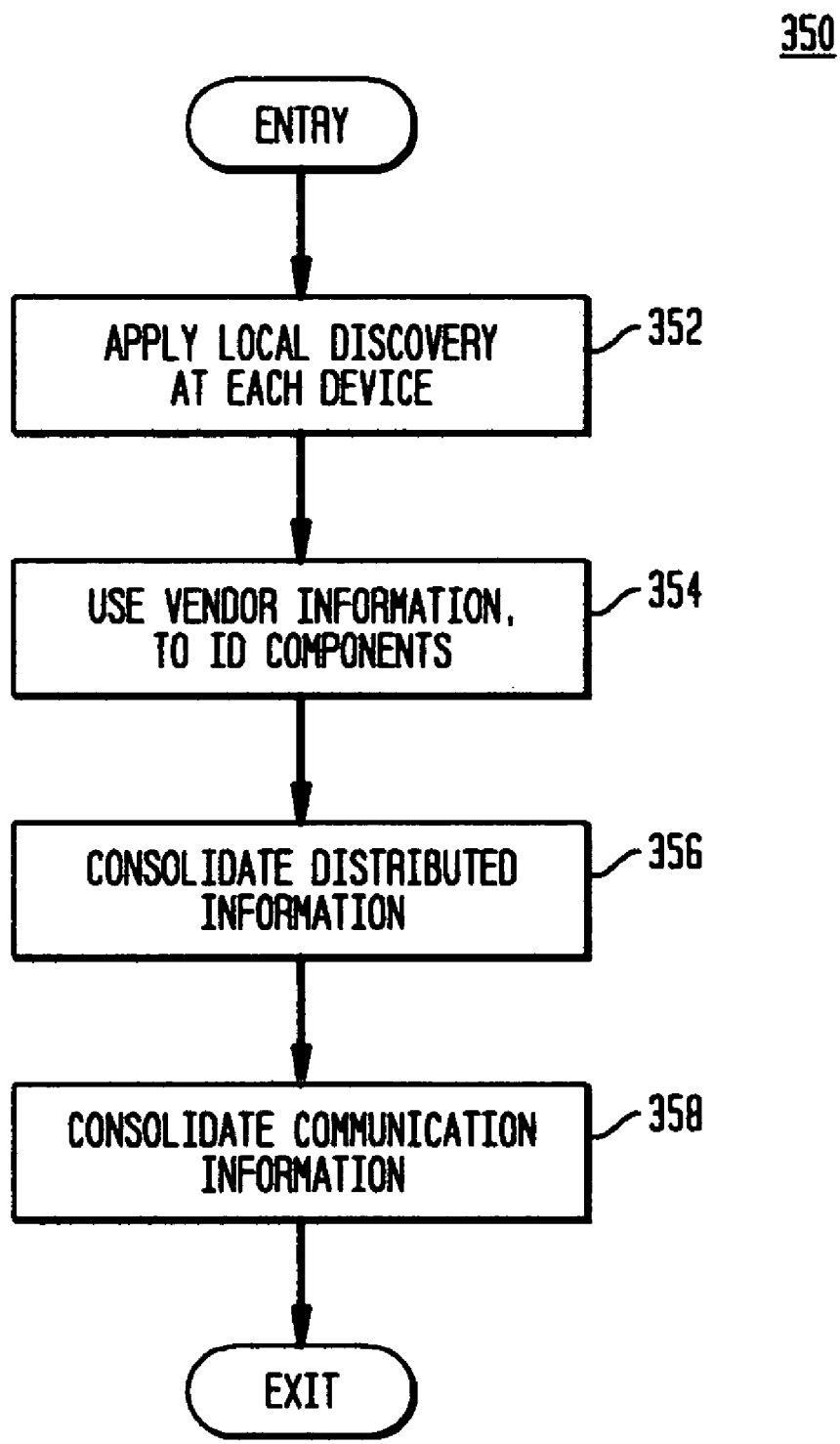

FIG. 3C illustrates a flow chart of an exemplary process 350 for discovering processes on remote application servers. In this illustrative process, discovery of local resources are preformed at each of the remote sites in a manner similar to that shown in FIG. 3B, at block 352. At block 354, vendor information of the remote site is obtained to identify specific components. At block 356, the information regarding the discovered application is consolidated and, at block 458, information regarding the communication protocol is consolidated and provided to the requesting platform or host.

FIG. 4A illustrates an abstract model or representation 400 of an application, in this case, an application server, in accordance with the principles of the invention. The model shown is an extension of a known network models, such as the SMARTS® InCharge™ Common Information Model (ICIM), 410 or similarly defined or pre-existing CIM-based model and adapted for the network. SMARTS and Incharge are trademarks of System Management ARTs, Inc., White Plains, N.Y., USA. This model representation shown is an extension of the DMTF/SMI model. Model-based system representation is discussed in commonly-owned U.S. patent application Ser. No. 10/400,718, now U.S. Pat. No. 6,868,367 and U.S. Pat. Nos. 5,528,516, 5,661,668 and 6,249,755, the contents of all of which are incorporated by reference herein.

Abstract model 410 includes network elements or components that are selected for representation and referred to as managed components. The representation of the managed components includes aspects or properties of the component represented. In this case, an application server is represented as a managed object, referred to as ApplicationService 412. ApplicationService 412 is a generalization of objects of class Application 414 and MgmtAgent 416. Application 414 is a generalization of objects of classes ApplicationServer 418, ApplicationCluster420 and WebServer 422. LoadBalancer 424 is an object within the ApplicationCluster 420 object. Also shown is that object class MgmtAgent 416 contains objects NodeAgent 426 and DeploymentManager 428.

Figure 4B:
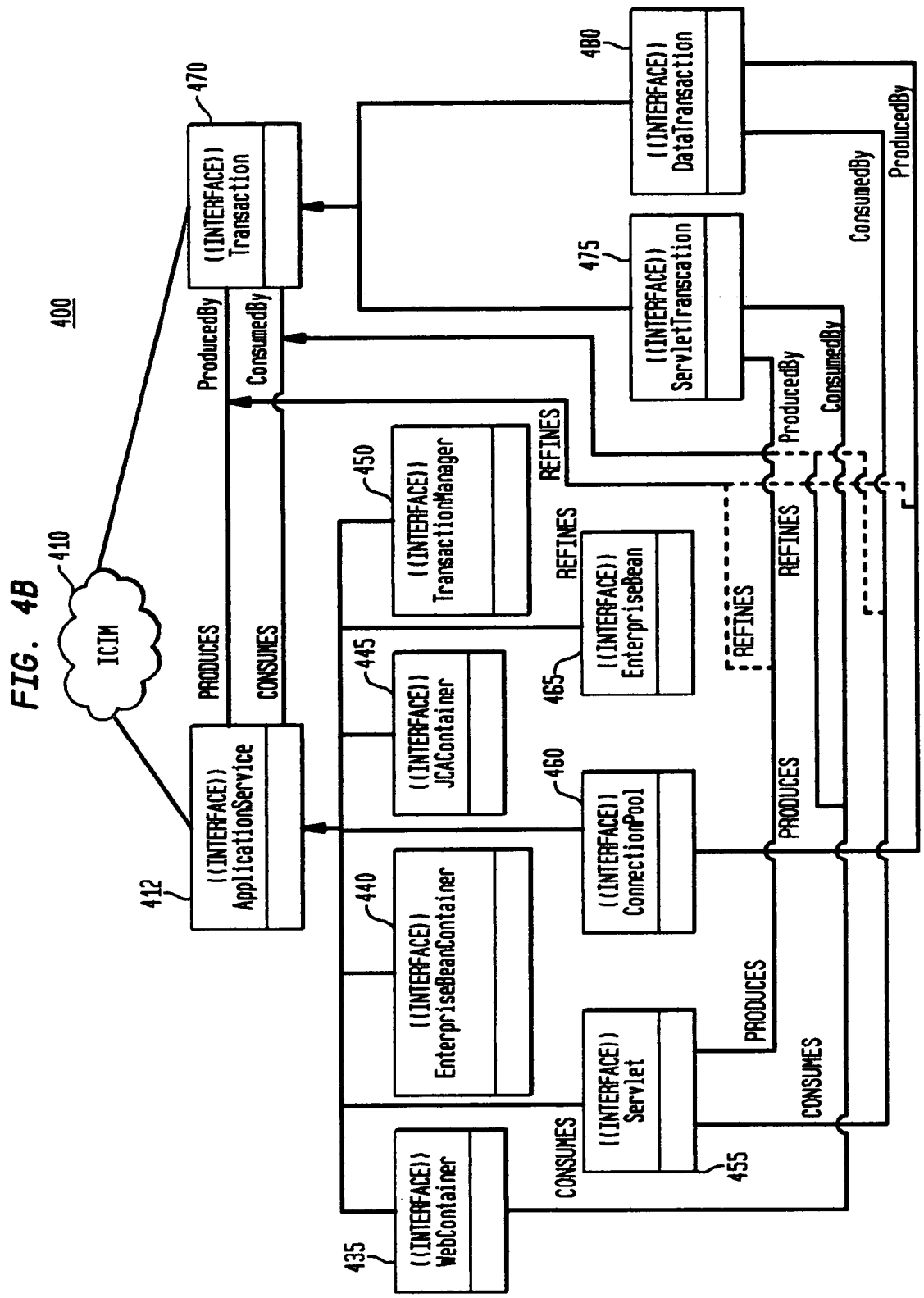
FIG. 4B illustrates an exemplary model of a J2EE application in accordance with the principles of the invention.

FIG. 4B illustrates an exemplary model of a J2EE WebServer application, shown in FIG. 2, with regard to the model shown in FIG. 4A, and the associated relationships in accordance with the principles of the invention. In this illustrative model, classes ApplicationServer 412 contains object classes WebContainer 435, EnterpriseBeanContainer 440, JCAContainer 445, TransactionManager 450, Servlet 455, ConnectionPool 460 and EnterpriseBean 465. Also shown is object class Transaction 470 which represents, as the name implies, a transaction conducted between two parties. Transaction 470 contains object classes ServletTransaction 475 and DataTransaction 480.

The objects and relationships may be more fully described as:

1. Object NodeAgent is a subclass of object MgmtAgent, which represents the process that runs in a host that serves as a management contact point with all ApplicationServers hosted by the host. When object NodeAgent has problems, administration ApplicationServers is impacted. As shown, object NodeAgent is a member of a cell, produces a session with object DeploymentManager, consumes sessions with ApplicationServer on the same host and has a Hostedby relationship with the host server;

2. Object DeploymentManager is a subclass of the object MgmtAgent, which is the focal point for administration of a cell in the object WebShpere. It has sessions with all of the NodeAgent objects that manage application servers in the cell that the object DeploymentManager manages. Object DeploymentManager is a member of a cell, consumes Session with the object NodeAgent and has a Hostedby relationship with the host;

3. LoadBalancer object is a specialization of the ApplicationCluster object intended to model the edge load balancer, which distributes the client requests to the web server. The main purpose of this specialization class is to provide a "placeholder" for the contact information for the SNMP instrumentation of the transactions to the individual WebServers that compose the cluster. Attributes of the object class LoadBalancer are the AgentAddress, which is a string like "address:port" which describes the port where the SNMP agent that instruments the load balancer can be found;

4. Object WebServer is an application that represents an instance of a WebServer process that is used to handle high volume interaction with the web browser, while forwarding dynamic contents to the WebSphere Application server. This component can be discovered through the configuration of the edge LoadBalancer object. The WebServer has a Partof relationship to LoadBalancer and ApplicationCluster objects, produces transactions with the WebBrowsers, WebClients and Sessions with the LoadBalancer. It further consumes transactions with the WebContainer object of the ApplicationServers objects and has a Hostedby relationship with the host. Attributes of the WebServer object class are the port, which has a default value of "80" and a secure port, which has a default value of "443;"

5. Object ApplicationServer represents the JVM (Java Virtual Machine) that runs the WebSphere. The actual web applications that run are layered over this application;
6. Object WebContainer is a subclass of ApplicationService, which manages the web components of the application;
7. Object EnterpriseBeanContainer is a subclass of the object ApplicationService, which manages the Enterprise Java Bean (EJB) components of the application;
8. Object JCAContainer is a specialization of the ApplicationsService, which manages the J2C and JDBC connections of the application in the WebSphere environment;
9. Object TransactionManager is an object class that manages the transaction;
10. Object Servlet is an ApplicationService subclass, which can be monitored with regard to performance;
11. Object ConnectionPool is a subclass of ApplicationService, which serves as an anchor for database and legacy external data links. Applications communicate with Connection pools through object ConnectionPools;
12. Object Cell is a manageable element and a WebSphere is a group of manageable servers, and its general health may be determined based on the health of the components;
13. JMSServer is a subclass of the object MessageQueueService. More specifically, the J2EE specification mandates a JMS provider be always available.

The model shown in FIGS. 4A and 4B are associated with the processing represented by blocks 310, 312 and 314 shown in FIG. 3A.

Figure 5:
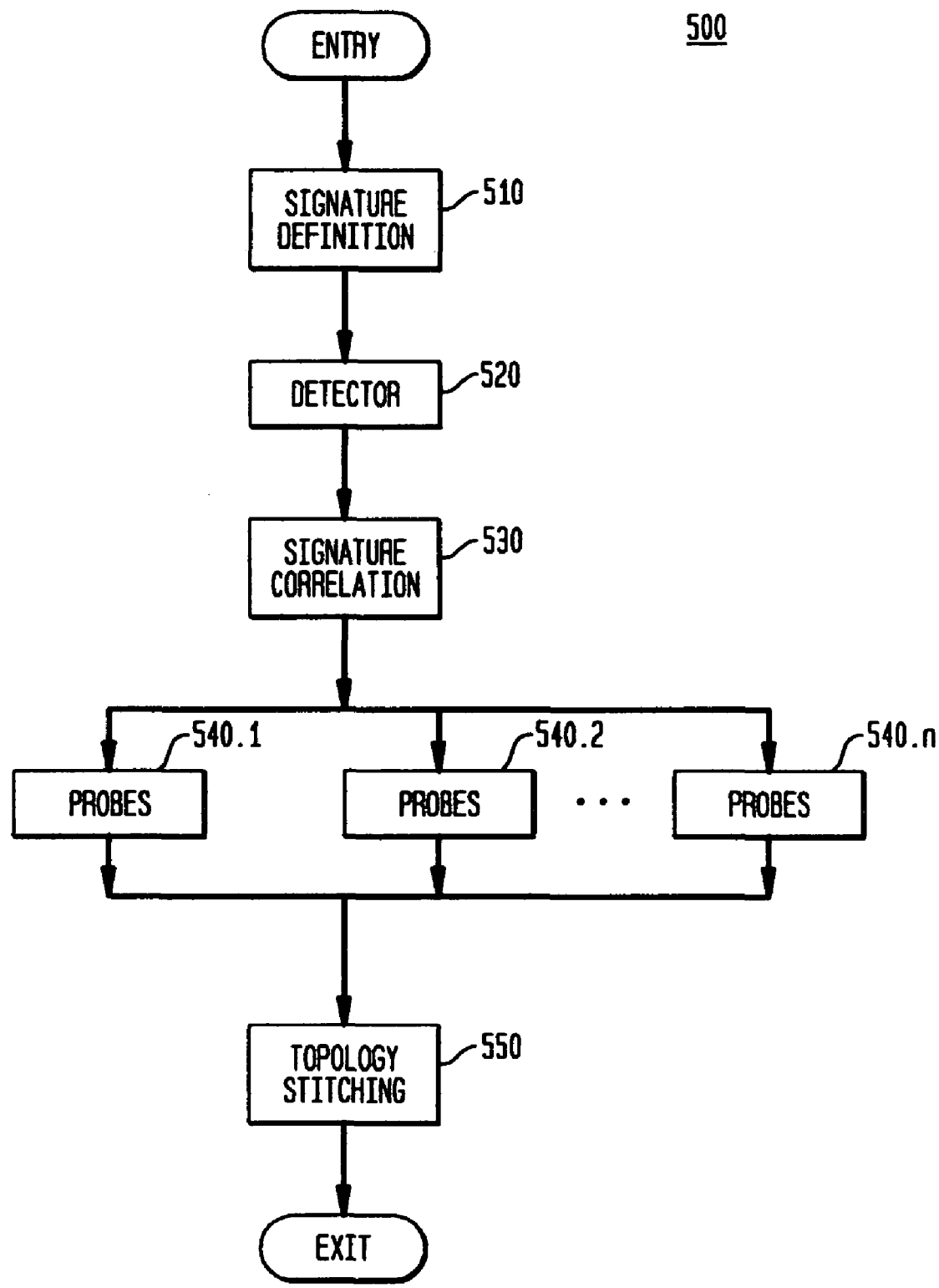
FIG. 5 illustrates a flow chart of an exemplary process for discovering applications in accordance with the principles of the invention.

FIG. 5 illustrates a flow chart of an exemplary process 500 for discovering application components in accordance with the principles of the invention. In this exemplary process information, e.g., a definition or signature, of the application is obtained at block 510. The application signature defines, in part, instructions or directives, that are represented, herein, as detector(s) and probe(s), used for discovering the applications. The processing referred to at block 510 is similar to that described with regard to blocks 320 and 322 in FIG. 3A and is more fully described in concurrently filed, commonly-owned, U.S. patent application Ser. No. 11/054,577, entitled "Method and Apparatus for Identifying and Classifying Network-Based Applications," the contents of which are incorporated by reference herein.

At block 520, processing associated with the detector, i.e., directives or instructions, obtained from the application signature is performed. In this case, the detectors provide a basic capability to find or determine clues with regard to the presence and identity of distributed applications. Detectors may represent elements, such as code or devices, that are responsible for interacting with the environment, i.e., network elements, and provide broad knowledge of the distributed application. The code or devices may, for example, initiate commands such as "presence requests" or an HTTP request of a port and may further operate on received responses to the initiated directives. Detectors provide an initial view, which is relatively broad, of the application and are executed with a low frequency. Detectors, in addition to information contained in the application signature, further provide instruction for more detailed analysis, as will more fully explained.

At block 530, the results of the detector responses are used to determine an initial or tentative classification and/or identification of an application. In one aspect the tentative identification may be made using a correlation function derived from the information contained in the application signatures, as will be more fully discussed.

After the tentative application identification, additional information regarding the application is obtained by selecting one or more of probes 540.1-540.$n$, which may include instructions or directives and executing the processing associated with the selected information. In this illustrate case, probes represent code responsible for interacting with the environment (network elements) and are provided with knowledge of the application in order to obtain characteristics and properties of the tentatively identified application. Probes 540.1-540.$n$, e.g., status requests, obtain more detailed information regarding the tentatively identified application to more fully identify the application.

At block 550, the characteristics, attributes, and/or properties obtained by the executed probes are collected and combined to confirm the identification of the tentatively identified application. In one aspect of the invention, the characteristics, attributes and properties obtained by the selected probes are sufficient to confirm the identification of the tentatively identified application and no further processing is necessary. In another aspect of the invention, the characteristics and properties obtained by the selected probes are not sufficient to confirm the identification of the tentatively identified application and additional processing is required. In this aspect of the invention, information from other sources may be utilized to complete the process of determining the identification of the distributed applications. For example, patterns of known relationships among application elements or components may be used to complete the identification and classification process when the information from selected probes is not sufficient to provide the information. This is patterns may be used to substantiate incomplete or known incorrect relationships. In another aspect, knowledge of known relationships, referred to as application endpoints, which are gateways between applications and/or application components, may be used to complete the identification and classification process. In still another aspect of the invention, responses from probes not associated with the tentatively identified application may be used to confirm or deny the identification.

FIGS. 6A and 6B illustrate an exemplary method for providing an initial application identification in accordance with one aspect of the invention. FIG. 6A, illustrates an exemplary method for correlating responses from selected detectors to applications in accordance with the principles of the invention. In this illustrates case, information regarding detectors obtained from the information associated with each application to be identified is organized such that the relationship between the responses from each of the detectors $DET_1$-$DET_m$ are associated with each of the applications $APP_1$-$APP_n$. The correlation or association values are in the form of known value, (e.g., 0 and 1) or a probabilistic relationship (in the range of 0.0-1.0) which may be predetermined or, in one aspect of the invention, adapted based on known information.

FIG. 6A illustrates the presence of application App, may be determined from responses from at least detector 1 ($DET_1$) and detector 2 ($DET_2$), as responses from $DET_3$ and $DET_4$ are only expected with a probability of 0.5 and 0.75, respectively. $DET_3$ and $DET_4$ may be associated with optional application components, for example, and need not be present to tentatively identify the application. Similarly, the presence of application $App_2$ requires a response from $DET_2$ and responses from $DET_1$, $DET_3$ and $DET_m$ are only expected with a probability of 0.5, 0.7 and 0.2, respectively.

In one aspect of the invention, an application may be initially or tentatively identified as that application having a high correlation determined as the largest accumulated value in response to the detectors activated. In a second aspect of the invention, an application may initially or tentatively be identified as that application having a high correlation determined as the number of responses and/or the probability that a response is required. For example, failure to receive a response from $DET_1$ indicates that the application is not $APP_1$ as a response to the specific detector is required. However, failure to receive a response from $DET_3$, indicates that the application is not $APP_n$. In this case, the application may be tentatively identified as either $APP_1$ or $APP_2$, dependent upon response from the other detectors.

FIG. 6B illustrates a second example of a correlation operation for tentatively identifying applications based on the responses to the detectors. In this illustrative example, responses from detectors 1, 2, 3, i and j, indicate that applications $APP_1$ and $APP_n$ are both present and a tentative identification of both $APP_1$ and $APP_n$ may be made.

Figure 7C:
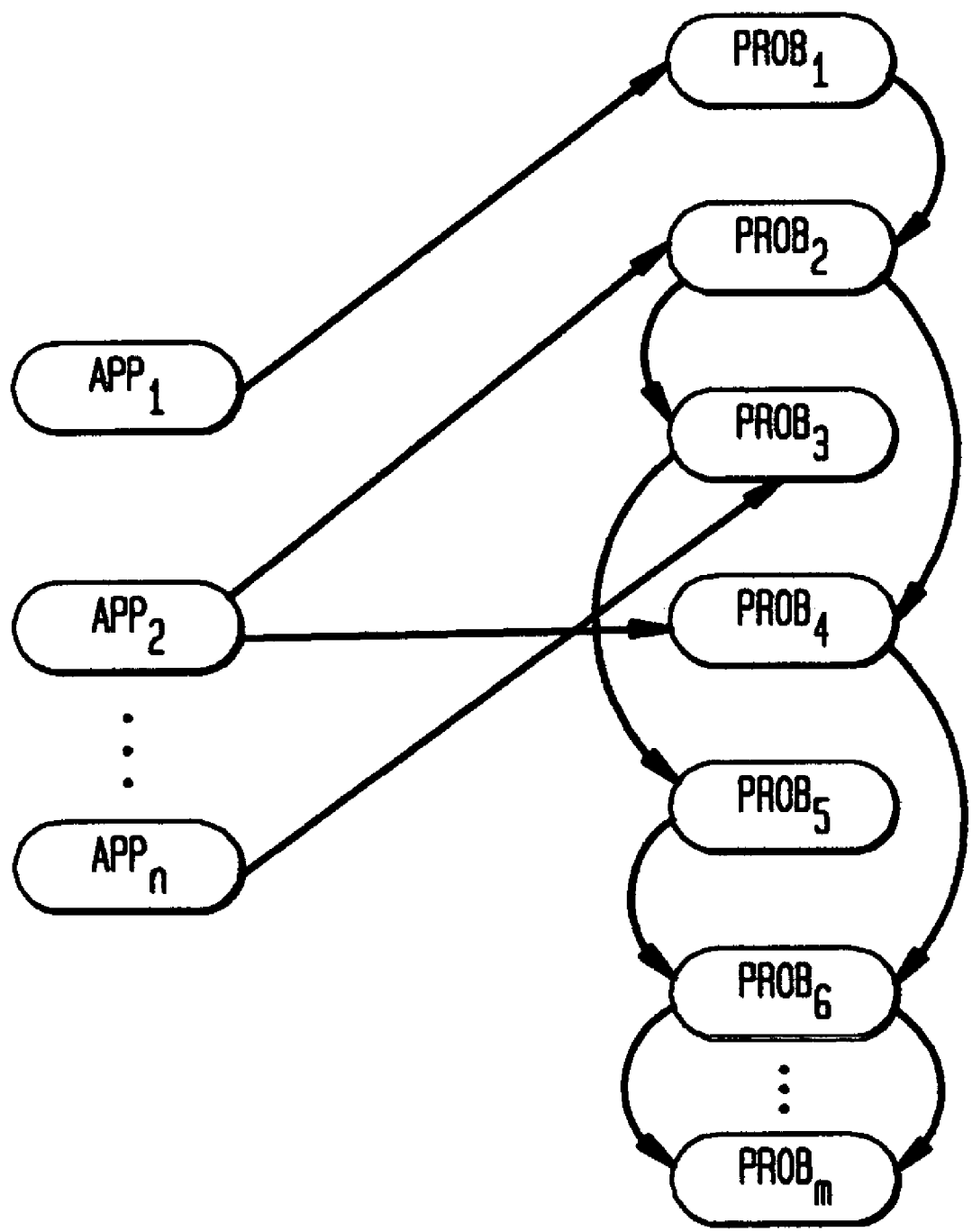

FIGS. 7A-7C illustrate different for selecting probes based on a tentative application identification. FIG. 7A illustrates that probes may be associated with each tentatively identified application and based on the tentative application identification, the associated probes are executed. As would be recognized, the associated probes may be executed sequentially or in parallel and the results collected as discussed with regard to block 550 (FIG. 5). FIG. 7B illustrates a second method for selecting probes based on a tentative application identification, wherein each application is associated with one or more probes selected from a plurality of probes. FIG. 7C illustrates a third, and preferred, method for selecting probes based on a tentative application identification, wherein each application is associated with one or more probes selected from a plurality of probes and the selected probes may further select additional probes based on the responses received. Hence, the information obtained from a selected probe may be supplemented or enhanced by the subsequent selection of a secondary probe. As would be recognized, by utilizing the processing shown in FIG. 7C for example, the probe selected based on the tentative application identification may initiate subsequent probes to identify additional components of one or more applications. Although only selection of a secondary probe is illustrated, it would be recognized by those skilled in the art, additional layers of subsequent probe selection may be included and is considered within the scope of the invention.

FIGS. 8A and 8B illustrate examples of application signatures in accordance with the processing disclosed herein. FIG. 8A illustrates an exemplary signature or information regarding the application, WebSphere AppServer and FIG. 8B illustrates an exemplary signature of information regarding the application WebSphere DeploymentManager. WebSphere Application Servers and WebSphere Deployment Managers are components of the IBM WebSphere architecture. WebSphere Application Server interacts with clients served over the world wide web (Internet), while WebSphere Deployment Manager Application allow for the administration of a set of WebSphere Application Servers.

With regard to FIG. 8A, exemplary information regarding the detectors, i.e., first instruction processing, is represented as Port: 9091, 810, Request: Get/Http/1.0, 812 and ProcessName/Websphere/AppServer//Java, 816. An expected response to the Request: Get, 812, is represented as Response: "Server: Websphere" 814. More specifically, instructions are provided to interrogate the network using a specific command on port 9091. An expected response to the instruction is "Server:WebSphere, if the server is hosting a WebSphere application. When the WebSphere application is tentatively identified, instructions, referred to as "WAS Probe," 818, may be executed to determine more detailed characteristics of the tentatively identified application.

FIG. 8B illustrates a similar signature for a WebSphere Deployment Manager Application. In this case, the detector information, is similar to that shown in FIG. 8A, i.e., Port: 9091, 820, Request: Get/Http/1.0, 822, however, the ProcessName/Websphere/Deployment//Java, 826 is different. The expected response to the Request:Get 822 is Response: "Server: WebSphere" 824. In this case, when a WebSphere Deployment Manager Application is tentatively identified, the probe "WAS Domain" 828 is executed to determine additional characteristics of the WebSphere Deployment Manager Application There is also shown a section that may be used to provide instruction for testing the identified application. The testing may include, for example, processing that is performed at a known rate. Details regarding the contents of the detector, probe and test section are more fully disclosed in the commonly-owned patent application, U.S. patent application Ser. No. 11/054,577, entitled "Method and Apparatus for Identifying and Classifying Network-Based Applications, and need not be discussed in further detail herein.

FIG. 9 illustrates an exemplary correlation relationship derived from the information associated with the detectors and applications for the examples shown in FIGS. 8A and 8B. In this case, Websphere application server requires, i.e, 1, an appropriate response from the Port detector and a first ProcessName detector whereas the Websphere DeploymentManager application requires, i.e., 1, an appropriate response from the Port detector and a second ProcessName detector.

Dependent upon the responses received from the detectors, a tentative identification of the application may be made and the appropriate probe (second instructions processing) may be initiated. The probes are, in this illustrative example, contained in corresponding application information signatures and represented as Probe: WAS Probe and Probe: WAS Domain, respectively.

Figure 10A:
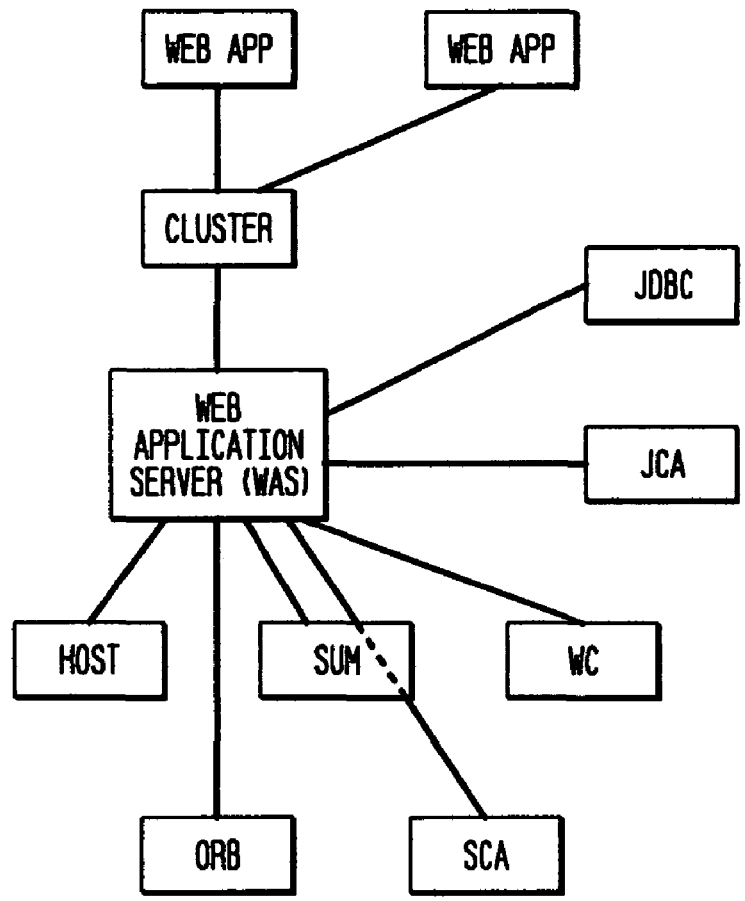
FIGS. 10A and 10B illustrate exemplary application topology of the applications shown in FIGS. 8A and 8B, respectively.
Figure 10B:
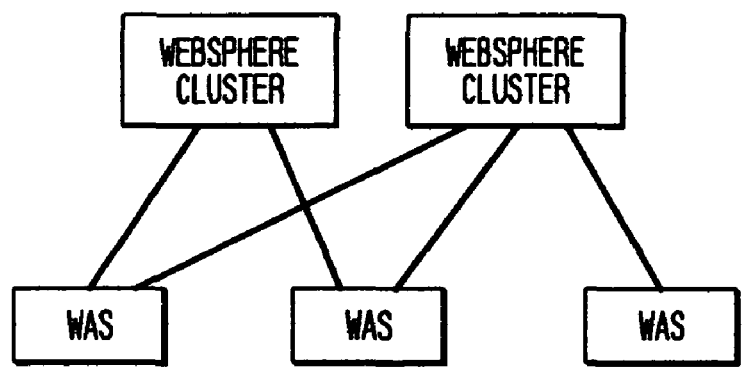

FIGS. 10A and 10B illustrate an exemplary WebSphere topology in view of the execution of the exemplary application signatures shown in FIGS. 8A and 8B. More specifically, the probe referred to as WAS Probe shown in FIG. 8A, may inspect the environment and instantiate the model, as described in FIG. 4b, as it becomes relevant to the current environment, for which an example is shown in FIG. 10A. Similarly, the probe WAS Domain, shown in FIG. 8B, may inspect the environment and instantiate the model, as described in FIG. 4b, as it becomes relevant to the current environment, for which an example is shown in FIG. 10B.

As would be further recognized, by inspecting and probing the WebSphere Deployment Manager (FIG. 10B) it is possible to discover a list of WebSphere Application Servers (WAS) and instantiate their representation by the same WebSphere Application Servers discovered and represented as in FIG. 10A. Hence, the topology of the Deployment Manager may be obtained by collecting topology information of previously determined WebSphere applications and utilizing this information to determine the topology of the Deployment Manager. This utilization information of other applications is advantageous as it reduces the number of probes required and further allows for the determination of relationships for which no information or probes are available.

Figure 11:
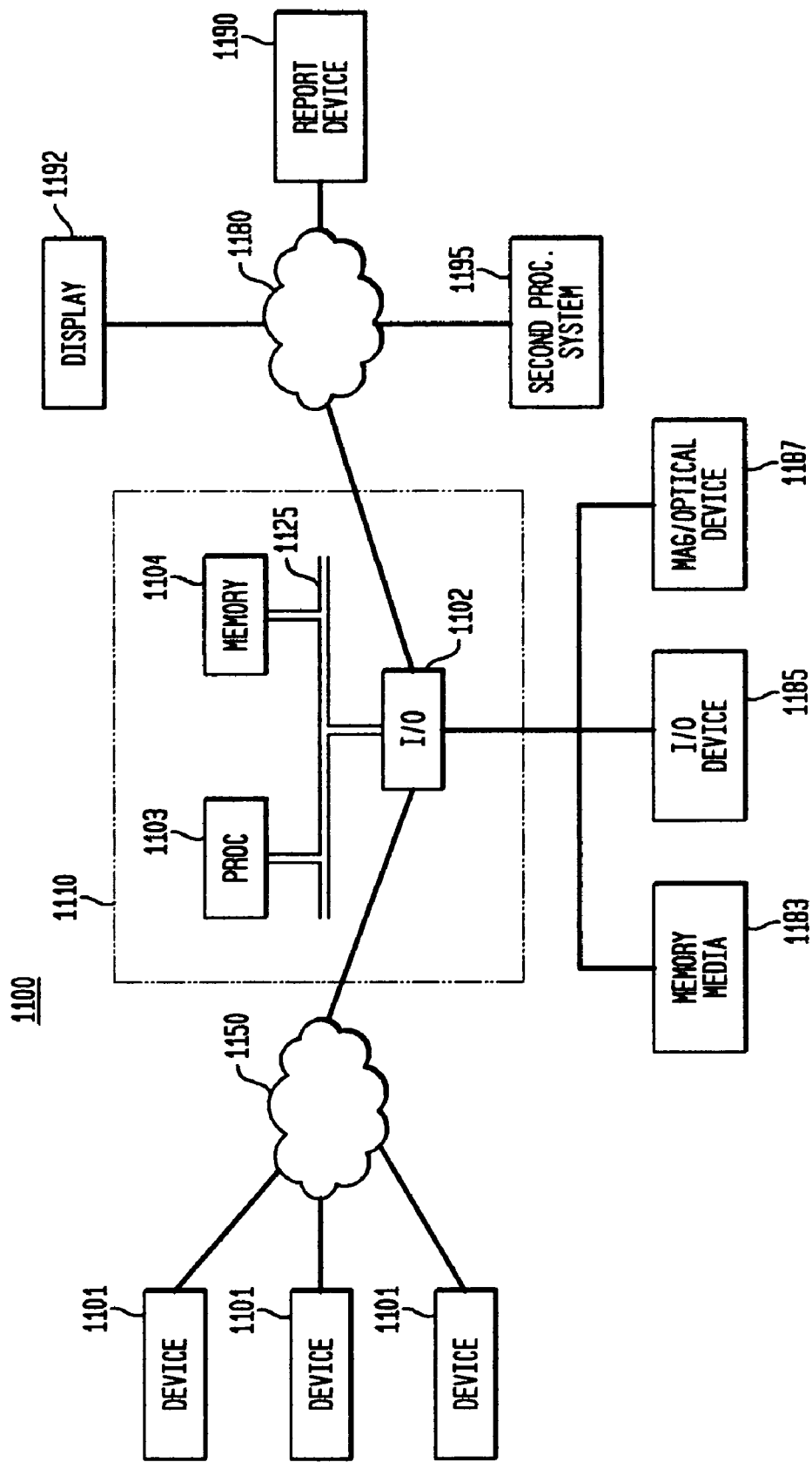
FIG. 11 illustrates an exemplary system for executing the processing shown herein.

FIG. 11 illustrates an exemplary embodiment of a system 1100 that may be used for implementing the principles of the present invention. System 1100 includes processing unit 1110 that may contain one or more input/output devices 1102, processors 1103 and memories 1104. I/O devices 1102 may access or receive information from one or more sources or devices 1101. Sources or devices 1101 may be devices such as routers, servers, computers, notebook computer, PDAs, cells phones or other devices suitable for transmitting and receiving information responsive to the processes shown herein. Devices 1101 may have access over one or more network connections 1150 via, for example, a wireless wide area network, a wireless metropolitan area network, a wireless local area network, a terrestrial broadcast system (Radio, TV), a satellite network, a cell phone or a wireless telephone network, or similar wired public networks, such as POTS, INTERNET, LAN, WAN and/or private networks, e.g., INTRANET, as well as portions or combinations of these and other types of networks. Network 1150 may similarly represent a communication bus, such as PCI, USB, Firewire, etc.

Input/output devices 1102, processors 1103 and memories 1104 may communicate over a communication medium 1125. Communication medium 1125 may represent, for example, a bus, a communication network, one or more internal connections of a circuit, circuit card or other apparatus, as well as portions and combinations of these and other communication media. Input data from the devices 1101 is processed in accordance with one or more programs that may be stored in memories 1104 and executed by processors 1103. Processors 1103 may be any means, such as general purpose or special purpose computing system, such as a laptop computer, desktop computer, a server, handheld computer, or may be a hardware configuration, such as dedicated logic circuit, or integrated circuit. Processors 1103 may also be Programmable Array Logic (PAL), or Application Specific Integrated Circuit (ASIC), etc., which may be "programmed" to include software instructions or code that provides a known output in response to known inputs. In one aspect, hardware circuitry may be used in place of, or in combination with, software instructions to implement the invention. The elements illustrated herein may also be implemented as discrete hardware elements that are operable to perform the operations shown using coded logical operations or by executing hardware executable code.

In a one aspect, the processes shown herein may be represented by computer readable code stored on a computer readable medium. The code may also be stored in the memory 1104. The code may be read/downloaded from a memory medium 1183, an I/O device 1185 or magnetic or optical media, such as a floppy disk, a CD-ROM or a DVD, 1187. Although not shown, it would be recognized that the code may be stored on a device and downloaded via a network to processor 1103. The downloaded computer readable code may be stored in memory 1104 or executed directly by processor 1103. Further it would be understood that the code may be processor specific or processor non-specific. Code written in the Java programming language is an example of processor non-specific code. Java is a trademark of the Sun Microsystems Corporation.

Information from device 1101 received by I/O device 1102, after processing in accordance with one or more software programs operable to perform the functions illustrated herein, may also be transmitted over network 1180 to one or more output devices represented as display 1192, reporting device 1190, e.g., printer, or second processing system 1195. As one would recognize, networks 1125, 1150 and 1180 may be physically be the same network or may be different networks that operate on the same or different communication principles.

As one skilled in the art would recognize, the term computer or computer system may represent one or more processing units in communication with one or more memory units and other devices, e.g., peripherals, connected electronically to and communicating with the at least one processing unit. Furthermore, the devices may be electronically connected to the one or more processing units via internal busses, e.g., ISA bus, microchannel bus, PCI bus, PCMCIA bus, USB, etc., or one or more internal connections of a circuit, circuit card or other device, as well as portions and combinations of these and other communication media or external networks, e.g., the Internet and Intranet.

While there has been shown, described, and pointed out fundamental novel features of the present invention as applied to embodiments thereof, it will be understood that various omissions and substitutions and changes in the apparatus described, in the form and details of the devices disclosed, and in their operation, may be made by those skilled in the art without departing from the spirit of the present invention. For example, while the flow charts depict a sequence of operating steps, this is shown for illustrative purposes only as the steps may be executed or performed in another sequence or order. It is expressly intended that all combinations of those elements that perform substantially the same function in substantially the same way to achieve the same results are within the scope of the invention. Substitutions of elements from one described embodiment to another are also fully intended and contemplated.

What is claimed is:

1. A computer implemented method for discovering applications having components distributed over a plurality of nodes in a network, the method comprising the steps of:

obtaining information associated with at least one application, said information providing first and second instructions;

executing processing of the first instructions;

determining an initial identification of the at least one application based on responses associated with the processing of the first instructions;

executing processing of the second instructions based on the of the tentatively identified applications;

confirming the initial identification of the at least one application based on responses associated with the processing of the second instructions;

obtaining correlating values from the information associated with each of the at least one applications, the correlating values representing first instructions processing responses and the at least one application; and generating a correlating relationship between each of the at least one applications and responses associated with the first instructions processing.

2. The method as recited in claim 1, further comprising the step of:

storing said application identification and characteristics of the identified application in a representation of the application.

3. The method as recited in claim 1, wherein the first instructions processing determining characteristics of the at least one application to tentatively identify the application.

4. The method as recited in claim 1, wherein the second instructions processing further determining characteristics of the at least one application to confirm the identification of the application.

5. The method as recited in claim 1, wherein the correlating values are altered by a predetermined factor.

6. The method as recited in claim 1, wherein the step of determining a tentative identification comprises the steps of:

identifying an application having a high correlation based on the first instructions processing responses.

7. The method as recited in claim 1, further comprising the step of:

identifying known additional application characteristics, not responsive to the first or second instructions processing, based on information associated with the confirmed application identification.

8. The method as recited in claim 1, wherein the step of confirming the application identification further comprises the step of:
utilizing responses associated with the second instructions processing to identify the at least one application.

9. The method as recited in claim 1, wherein the information associated with each of the at least one applications is contained in an associated application signature.

10. The method as recited in claim 2, wherein the representation is a model composed of object classes and relationships between the object classes.

11. The method as recited in claim 10, wherein the object classes are selected from the group consisting of: software element, software service, application service, database service, software request, software server, and software component.

12. The method as recited in claim 10, wherein the relationships between the object classes are selected from the group consisting of: Hosted/Hostedby, Composed/ComposedOf, Initiated/Initiatedby, Executed/ExecutedBy, and ConnectedTo/ConnectedVia.

13. The method as recited in claim 1, further comprising:
executing processing associated with a third instruction, said third instructions based on the at least one identified application.

14. The method as recited in claim 13, wherein the third instructions are performed at a predetermined time.

15. An apparatus for discovering applications having components distributed over a plurality of nodes in a network, the apparatus comprising:
a processor in communication with a memory, the processor executing code for:
obtaining information associated with at least one application, said information providing first and second instructions;
executing processing of the first instructions;
determining a tentative identification of at least one application based on responses associated with the processing of the first instructions;
executing processing of the second instructions based on each of the tentatively identified applications;
confirming an identification of at least one application based on responses associated with the processing of the second instructions; and
obtaining correlating values from the information associated with each of the at least one applications, the correlating values representing first instructions processing responses and the at least one application; and
generating a correlating relationship between each of the at least one applications and responses associated with the first instructions processing.

16. The apparatus as recited in claim 15, the processor further executing code for:
storing said application identification and characteristics of the identified application in a representation of the application.

17. The apparatus as recited in claim 15, wherein the first instructions processing determining characteristics of the at least one application to tentatively identify the application.

18. The apparatus as recited in claim 15, wherein the second instructions processing further determining characteristics of the at least one application to confirm the identification of the application.

19. The apparatus as recited in claim 15, the processor further executing code for: altering the correlating values by a predetermined factor.

20. The apparatus as recited in claim 15, the processor further executing code for determining a tentative identification by:
identifying an application having a high correlation based on the first instructions processing responses.

21. The apparatus as recited in claim 15, the processor further executing code for:
identifying known additional application characteristics, not responsive to the first or second instructions processing, based on information associated with the confirmed application identification.

22. The apparatus as recited in claim 15, the processor further executing code for confirming the application identification by:
utilizing responses associated with the second instructions processing to identify the at least one application.

23. The apparatus as recited in claim 15, wherein the information associated with each of the at least one applications is contained in an associated application signature.

24. The apparatus as recited in claim 16, wherein the representation is a model composed of object classes and relationships between the object classes.

25. The apparatus as recited in claim 24, wherein the object classes are selected from the group consisting of: software element, software service, application service, database service, software request, software server, and software component.

26. The apparatus as recited in claim 24, wherein the relationships between the object classes are selected from the group consisting of: Hosted/Hostedby, Composed/ComposedOf, Initiated/Initiatedby, Executed/ExecutedBy, and ConnectedTo/ConnectedVia.

27. The apparatus as recited in claim 15, the processor further executing code for:
executing processing associated with a third instruction, said third instructions based on the at least one identified application.

28. The apparatus as recited in claim 27, the processor further executing code for performing the third instructions at a predetermined time.

29. The apparatus as recited in claim 15, further comprising: an Input/Output device in communication with the processor.

30. The apparatus as recited in claim 16, wherein the code is stored in the memory.

31. A non-transitory, computer-readable storage medium containing code thereon, the code suitable for discovering applications having components distributed over a plurality of nodes in a network, by providing instructions to a computing system for executing the steps of:
obtaining information associated with at least one application, said information providing first and second instructions;
executing processing of the first instructions;
determining a tentative identification of at least one application based on responses associated with the processing of the first instructions;
executing processing of the second instructions based on each of the tentatively identified applications;
confirming an identification of at least one application based on responses associated with the processing of the second instructions;
obtaining correlating values from the information associated with each of the at least one applications, the correlating values representing first instructions processing responses and the at least one application; and generating a correlating relationship between each of the at least one applications and responses associated with the first instructions processing.

32. The non-transitory, computer-readable storage medium as recited in claim 31, the code further instruction for executing the step of:

storing said application identification and characteristics of the identified application in a representation of the application.

33. The non-transitory, computer-readable storage medium as recited in claim 31, wherein the first instructions processing determining characteristics of the at least one application to tentatively identify the application.

34. The non-transitory, computer-readable storage medium as recited in claim 31, wherein the second instructions processing further determining characteristics of the at least one application to confirm the identification of the application.

35. The non-transitory, computer-readable storage medium as recited in claim 31, the code further providing instruction for executing the step of:

altering the correlating values by a predetermined factor.

36. The non-transitory, computer-readable storage medium as recited in claim 31, the code further providing instruction for determining a tentative identification by:

identifying an application having a high correlation based on the first instructions processing responses.

37. The non-transitory, computer-readable storage medium as recited in claim 31, the code further providing instruction for executing the step of:

identifying known additional application characteristics, not responsive to the first or second instructions processing, based on information associated with the confirmed application identification.

38. The non-transitory, computer-readable storage medium as recited in claim 31, the code further providing instruction for executing the step of:

utilizing responses associated with the second instructions processing identify the at least one application.

39. The non-transitory, computer-readable storage medium as recited in claim 31, wherein the information associated with each of the at least one applications is contained in an associated application signature.

40. The non-transitory, computer-readable storage medium as recited in claim 32, wherein the representation is a model composed of object classes and relationships between the object classes.

* * * * *